2,909,412

CHEMICAL COMPOSITION AND PROCESS

Cletus E. Peeler, Jr., Dallas, Tex., assignor to Diamond Alkali Company, Cleveland, Ohio, a corporation of Delaware No Drawing. Application November 22, 1954
Serial No. 470,538

6 Claims. (Cl. 23—230)

This invention relates to improvements in the manufacture of water-soluble alkali metal silicates and to improvements in the properties of such silicates.

Alkali metal silicates, such as sodium metasilicate, are well known and have found extensive utility in various washing and cleansing arts, either alone or combined with other substances having properties complementary to the desirable characteristics of the silicates. The silicates having $Na_2O:SiO_2$ ratios of approximately 1:1 or higher are particularly useful in view of their increased alkali content.

Reference hereinafter will frequently be made to sodium metasilicate and its hydrates as typical commercially useful products. However, the present invention is concerned with alkali metal silicates generally and is not limited to sodium metasilicate, although it is recognized that the sodium silicates constitute the most widely used siliceous materials.

Perhaps the most common method of manufacturing sodium metasilicate involves the causticization of ordinary liquid sodium silicate, thereafter, if necessary, treating this liquid with caustic soda (76% $Na_2O$) to produce the desired alkali-silica ratio, and subsequently crystallizing the metasilicate by stirring, cooling, and seeding, as necessary. When a rise in temperature occurs, indicating incipient crystallization, the reaction mixture is cast into pans or molds, where it hardens and may be ground to the desired particle size.

However, as prepared in the above-described manner, or in other commercial processes, sodium silicates generally are subject to serious disabilities which heretofore not only have limited their commercial attractiveness, but in some instances have definitely restricted their use. Perhaps the most objectionable disability, particularly in the case of sodium metasilicate pentahydrate, is its relatively poor shelf life, in that within periods as short as a few weeks, silicates which, when originally manufactured were pure white, assume a discoloration, usually a yellowing. This discoloration darkens over a period of from about three to six months, detracting from their appearance and rendering the silicates unusable in many applications. Such discoloration is particularly disadvantageous in those applications where the white sodium metasilicate product is required, as when it is compounded with various other washing or cleansing compounds.

The present invention has as its principal object the provision of alkali metal silicates having improved properties over prior art compositions of similar character and function.

A further object of this invention is the provision of methods of preparing such silicates which preclude the disadvantageous discoloration heretofore encountered.

A still further object is the provision of methods of testing alkali metal silicates and compositions of matter useful in the practice of such methods.

These and other objects and advantages of the present invention will appear more fully from the following description.

The practice of the present invention contemplates contacting an alkali metal silicate with a source of at least one transitional element, the resultant color of the silicate indicating an alkaline or siliceous $Na_2O:SiO_2$ ratio and whether sufficient impurities are present to cause ultimate discoloration of the silicate. As used in the specification and claims herein, the expression "transitional element" is intended to include the metals scandium, titanium, vanadium, chromium, manganese, iron, cobalt, and nickel, as indicated in Mellor's Inorganic Chemistry, 1952 ed., at page 870. These metals may be further characterized as having less than ten electrons in the 3d orbital, as shown on pages 98–99 of Mellor. While sources of any of the foregoing metals may be used, it will be recognized that sources of chromium, manganese, iron, cobalt, and nickel generally are relatively inexpensive and more readily available. Accordingly, particular reference hereinafter will be made to these metals.

The present invention contemplates that the alkali portion of the silicate compositions under consideration may be any of the alkali metals, including lithium, sodium, potassium, rubidium, and cesium, although, as indicated hereinbefore, the recognized commercial compounds are usually sodium silicates. Moreover, except where otherwise indicated, reference will be made to the sodium metasilicate ratio material, as this material is normally of major commercial interest and heretofore frequently has exhibited the most pronounced ultimate discoloration.

In carrying out the practice of this invention, a quantity of aqueous sodium metasilicate liquor to be tested is contacted with a minor amount of at least one transitional element. The thus-formed mixture is allowed to crystallize and harden. Its color is indicative of the alkali-silica ratio and impurity content. Depending upon the color exhibited, alkali or silica corrections, or further purification of the silicate, if necessary, can be accomplished.

In some instances, even more advantageous results are obtained by contacting a silicate liquor with a mixture of compounds of these elements, a mixture of compounds of iron and cobalt in known proportions being particularly useful in this respect.

As sources of the foregoing metals, generally their compounds which are compatible with the silicate material and soluble therein may be used. However, it is preferred to employ a neutral compound to avoid any undesired alteration of the alkali-silica ratio in the material being treated. Illustrative of satisfactory compounds which may be employed are halides, the chlorides and bromides being preferred, nitrates, sulfates, and thiocyanates. It will be understod, of course, that compounds of the metals in which the metals have varying valences are included among those which may be employed. For example, cobaltous and cobaltic compounds and/or ferric and ferrous compounds may be used. In addition to the aforementioned compounds, various complex salts may be used, any such complex salt, such as complex iron salts, for example, preferably meeting the requirements of neutrality, compatibility, and solubility in the metasilicate. While any of the aforementioned compounds may be employed, in testing sodium metasilicate pentahydrate liquors, it is preferred to use a cobalt compound as the test reagent since cobalt has been found to produce a sharper and more rapid color change.

Optimum results are obtained in testing metasilicates by using cobalt acetate tetrahydrate at a concentration of 0.032% by weight based on the weight of silicate liquor. Thus, with a 300 gm. sample of liquor, 4 ml. of a 10% solution of $Co(C_2H_3O_2)_2 \cdot 4H_2O$ is employed. In testing other hydrated metasilicates, it is generally desirable to vary the quantity of color indicator in proportion to the degree of hydration. Hence, in working with the nine hydrate it is advantageous to double the amount of cobalt acetate used in testing the pentahydrate. In many instances, optimum results are obtained using, in combination with a cobalt salt, an iron compound, either ferrous or ferric. While generally any iron and cobalt compounds meeting the hereinbefore prescribed requirements may be employed, it has been found that cobaltous acetate and its hydrates, particularly the tetrahydrate, alone, or in combination with a compound selected from the group of ferrous acetate and ferrous sulfate, is preferred.

The practice of this invention provides a rapid, sharply-defined color change indicative of the critical meta ratio and the presence of impurities in amounts sufficient to cause subsequent discoloration of the silicate. It will be understood that the metallic color indicator of this invention also is useful in determining the variation of a particular metasilicate liquor from the true metasilicate ratio. By comparison of the developed color with predetermined standards, by comparison with untreated samples from the same batch of silicate, or preferably by conducting one or more tests in which an amount of alkali, e.g., sodium hydroxide, sufficient to alter the $Na_2O:SiO_2$ ratio by a predetermined amount is added, the alkalinity or siliceousness may be accurately determined.

The presently preferred practice of this invention in testing evaporated metasilicate liquors involves weighing two samples of the liquor having a specific gravity within the range from 61°–63° Bé. at 100° C., cooling these samples to 650 C., adjusting one sample with sodium hydroxide to a known alkali-silica ratio differential of 0.015 $Na_2O$ (or other predetermined amount) and adding minor amounts of cobalt and iron solutions to both samples. The silicates are then crystallized and cast on flat glass plates for color observation. It will thus be appreciated that the present invention provide an extremely valuable process control. The practice of this invention, unlike convential analytical procedures, permits the rapid, accurate evaluation of silicate liquors, thereby facilitating frequent checking of product quality. It will be appreciated by those skilled in the art that while reference herein is made to various silicate liquors, anhydrous silicates may be tested readily merely by dissolving a portion of the silicate in water to form a crystallizable material.

In order that those skilled in the art may more completely understand the present invention and the preferred methods by which the same may be carried into effect, the following specific examples are offered:

EXAMPLE I

Part A

Into each of two 400 ml. beakers are weighed exactly 300 gms. of a sodium metasilicate pentahydrate liquor, having a specific gravity of 61°–63° Bé. at 100° C., to be tested. Into one of the beakers, the contents of which are first cooled to 65° C., are added 4 ml. of a 10% aqueous cobaltous acetate solution and 1 ml. of a 10% aqueous ferric sulfate solution. The resultant mixture is stirred thoroughly and, when a 2° C. temperature rise indicates incipient crystallization, is poured out to harden on a glass pane.

To the contents of the other beaker is added exactly 3.3 gms. of 50% sodium hydroxide to establish an $Na_2O:SiO_2$ ratio differential of 0.015 greater than the other sample. This mixture is stirred thoroughly and to it are then added 4 ml. of a 10% aqueous cobaltous acetate solution and 1 ml. of a 10% aqueous ferric sulfate solution. This mixture is stirred thoroughly and when a 2° temperature rise indicates incipient crystallization, is poured out on a glass pane and allowed to harden.

The first cake, containing no added caustic, is a uniform deep blue color, indicating a siliceous ratio material and that the $SiO_2:Na_2O$ ratio is sufficient to preclude subsequent turbidity and discoloration of the silicate. The second cake, deliberately causticized with sufficient sodium hydroxide to provide a predetermined alkali-silica ratio variation, develops a yellow ring around its edge within 30 minutes, thereby indicating that the $Na_2O:SiO_2$ ratio in the silicate being tested is sufficiently close, i.e., within .015 unit of the true meta ratio to obtain the desired characteristics of the metasilicate and yet avoid subsequent turbidity, gumminess, and product discoloration.

Part B

Further to illustrate the results obtained in accordance with this invention, when a sodium metasilicate pentahydrate liquor which would be subject to subsequent discoloration is tested, the procedure of Part A above is repeated, using a sample of another metasilicate liquor. In this case, the silicate cake, containing no added caustic, exhibits a yellowing around its edge within 1 hour, thereby indicating any undesired alkalinity of the silicate and that ultimate turbidity and discoloration of the metasilicate will occur unless an addition of silica is made or the liquor further purified.

Part C

The test described in Part A above is repeated, using metasilicate liquor in which the $Na_2O:SiO_2$ ratio is less than 1.0:1.0. In this case, 3.3 gms. of 50% sodium hydroxide is added to the liquor being tested in an amount sufficient to alter the $Na_2O:SiO_2$ ratio a predetermined amount, i.e., .015 unit. The resultant silicate cake develops no yellow ring, thereby indicating the silicate liquor is too siliceous.

In the practice of the invention, as indicated in Example I, when a metasilicate liquor of unknown $Na_2O:SiO_2$ ratio and impurity content is to be tested, it is generally desirable to add separately the metallic color indicator of this invention to an untreated sample of the liquor and to a deliberately causticized sample, the amount of sodium hydroxide added being that necessary to alter the $Na_2O:SiO_2$ ratio in a predetermined amount. This amount generally is dictated by the permissible variation from the metasilicate ratio, i.e., if there may be a ±0.015 variation, a caustic addition sufficient to alter the $Na_2O:SiO_2$ ratio 0.015 unit, or some multiple thereof, is employed. By such a procedure, the change from the stable color of a satisfactory silicate liquor to the rapid discoloration, characteristic of unsatisfactory silicate liquor, is readily determined and the addition of caustic or silica, or the further purification needed, is indicated.

The practice of this invention is particularly useful in the testing of sodium metasilicate liquors within ±0.018 mol unit from the true meta ratio. Hence, it is highly advantageous in testing silicates having an $Na_2O:SiO_2$ ratio within the range from 1.000:1.000 to 1.018:1.000. While siliceous ratio materials are readily evaluated, silicates having an $Na_2O:SiO_2$ ratio substantially in excess of 1.018:1.000 generally require a longer period of time, e.g., 1 hour or more, to exhibit a color indicative of their alkalinity and impurity content. However, those skilled in the art will recognize, of course, that in many instances the rapidity of the color change is not an important factor and, hence, may utilize the present invention in a wide variety of applications and in testing silicates other than the metasilicates.

The following examples illustrate the use of other color indicators in accordance with the invention.

EXAMPLE II

Part A

To 170 gms. of an alkaline ratio sodium metasilicate pentahydrate liquor is added 0.534 gm. of $$FeSO_4 \cdot (NH_4)_2SO_4 \cdot 6H_2O$$

dissolved in 5 ml. of water. This mixture is poured on a glass plate and allowed to harden. In 30 minutes the color of the cake has changed from white to a distinct yellow, thereby indicating an $Na_2O:SiO_2$ ratio greater than 1.0:1.0 and the presence of sufficient impurities to cause ultimate discoloration of the silicate liquor. A chemical analysis of the liquor indicates that the $Na_2O:SiO_2$ ratio is 1.004:1.000.

Part B

The procedure of Part A is repeated, using a siliceous ratio sodium metasilicate liquor. The cast silicate does not exhibit any color change but remains white. A chemical analysis of the liquor indicates that the $Na_2O:SiO_2$ ratio is 0.998:1.000.

EXAMPLE III

Part A

To 400 gms. of a metasilicate liquor having an $Na_2O:SiO_2$ ratio of 0.964 is added 10 ml. of an aqueous solution of ferrous sulfate, said solution being prepared by dissolving 17.43 gms. of $FeSO_4 \cdot 7H_2O$ in distilled water which contains 15 ml. of $N/50$ $H_2SO_4$ and subsequently diluting the mixture to a volume of 250 ml. The resultant silicate is cast on a glass pane and allowed to harden. The color of the silicate cake changes from white to a blue-gray.

Part B

To a 400 gm. portion of the same metasilicate liquor used in Part A are added 4.8 gms. of C.P. sodium hydroxide pellets to provide an alkaline ratio liquor, and 5 ml. of the ferrous sulfate solution of Part A. The resultant silicate mixture is cast on a glass pane and allowed to harden. A gray-green color develops, indicating an alkaline ratio metasilicate and the presence of sufficient impurities to cause discoloration.

EXAMPLE IV

Part A

To illustrate the effect of using a ferric salt as color indicator, 0.365 gm. of $Fe_2(SO_4)_3$, dissolved in 10 ml. of distilled water, is added to 280 gms. of a commercial sodium metasilicate liquor. During the addition of the ferric sulfate solution to the silicate liquor, the liquor becomes light pink in color but upon subsequent crystallization becomes white and remains so. Chemical analysis of the liquor indicates an $Na_2O:SiO_2$ ratio of 0.96:1.0.

Part B

To 280 gms. of the same batch of commercial sodium metasilicate liquor are added 6.0 gms. of 50% aqueous sodium hydroxide, to provide an alkaline ratio material, and 0.365 gm. of $Fe_2(SO_4)_3$ dissolved in 10 ml. of distilled water. This mixture is cast on a glass pane and allowed to harden and in 50 minutes is a bright yellow in color.

EXAMPLE V

Part A

To 300 gms. of metasilicate liquor is added 0.4 gm. of chromic acetate dissolved in 5 ml. of water. The resultant silicate mixture, yellow-green in color, is cast on a glass plate and allowed to harden. No color change is observed in this siliceous meta cake, the color remaining a light yellow-green.

Part B

To 300 gms. of the same meta liquor used in Part A are added 6 gms. of 50% sodium hydroxide to insure an alkaline ratio material and 0.4 gm. of chromic acetate dissolved in 5 ml. of water. As in Part A, the resultant liquor is yellow-green in color. This liquor is then cast on a glass plate, whereupon within 50 minutes a distinct yellow ring appears around the edge of the cake, gradually displacing the green and moving inwardly until the whole alkaline ratio cake is yellow.

EXAMPLE VI

Part A

To 400 gms. of sodium metasilicate liquor having an $Na_2O:SiO_2$ ratio of 0.977:1.0 is added 0.213 gm. of manganous sulfate dissolved in 10 ml. of water containing 1 ml. of $N/50$ $H_2SO_4$. This mixture is cast on a glass plate and allowed to harden, the addition of manganous sulfate causing the siliceous ratio meta liquor to become deep pink in color. This deep pink color persists and does not vary in shade.

Part B

To 400 gms. of the same metasilicate liquor of Part A are added 0.213 gm. of manganous sulfate dissolved in 10 ml. of water containing 1 ml. of $N/50$ $H_2SO_4$ and 5.8 gms. of 50% sodium hydroxide to insure an alkaline ratio material. The original deep pink color caused by the manganous sulfate addition disappears as the silicate hardens when cast on a glass plate. The pink color is replaced by a dark brown to black color first appearing at the edge of the cake and gradually moving inward.

EXAMPLE VII

Part A

To 300 gms. of siliceous ratio sodium metasilicate liquor is added 5 ml. of nickel acetate solution containing 0.316 gm. of nickel acetate tetrahydrate. The resultant silicate liquor is crystallized and cast on a glass plate. The cake remains white and does not discolor with age.

Part B

To 300 gms. of the silicate liquor of Part A are added 5 ml. of water containing 0.316 gm. of nickel acetate tetrahydrate and 6 gms. of 50% sodium hydroxide to insure an alkaline ratio material. As in Part A, the liquor is cast on a glass plate and upon casting is white in appearance. However, in 16 minutes the color changes to cream, the color gradually moving inward, and in 42 minutes the entire cake is a cream color.

The silicate colors produced in accordance with the foregoing examples are summarized in the following illustrative table, which table, of course, is not to be construed as limiting the invention:

| Additive | $Na_2O:SiO_2$ Ratio | Initial Color | Final Color |
| --- | --- | --- | --- |
| $Co(C_2H_3O_2)_2 \cdot 4H_2O$ | Alkaline | Blue | Yellow. |
| | Siliceous | do | Blue. |
| $Co(C_2H_3O_2)_2 \cdot 4H_2O$ and $Fe_2(SO_4)_3$ | Alkaline | do | Yellow. |
| | Siliceous | do | Blue. |
| $FeSO_4 \cdot (NH_4)_2 SO_4 6H_2O$ | Alkaline | White | Yellow. |
| | Siliceous | do | White. |
| $FeSO_4 \cdot 7H_2O$ | Alkaline | do | Blue-Gray. |
| | Siliceous | do | Gray-Green. |
| $Fe_2(SO_4)_3$ | Alkaline | Light Pink | Bright Yellow. |
| | Siliceous | do | White. |
| $Cr(C_2H_3O_2)_3$ | Alkaline | Yellow-Green | Yellow. |
| | Siliceous | do | Yellow-Green. |
| $MnSO_4 \cdot H_2O$ | Alkaline | Deep Pink | Brown to Black. |
| | Siliceous | do | Deep Pink. |
| $Ni(C_2H_3O_2)_2 \cdot 4H_2O$ | Alkaline | White | Cream. |
| | Siliceous | do | White. |

It is to be understood that although the invention has been described with specific reference to particular embodiments thereof, it is not to be so limited, since changes and alterations therein may be made which are within the full intended scope of this invention as defined by the appended claims.

What is claimed is:

1. A composition of matter consisting essentially of an aqueous solution of minor amounts of cobaltous acetate tetrahydrate and ferrous acetate.

2. A composition of matter consisting essentially of an aqueous solution of minor amounts of cobaltous acetate tetrahydrate and ferric sulfate.

3. In the testing of alkali metal silicates, the step of adding to the silicate product a minor amount of at least one water-soluble salt of an element of the First Transition Series and thereafter allowing the thus-treated silicate to crystallize and solidify, the color exhibited within a relatively short time after solidification indicating whether ultimate discoloration of the silicate inherently will result.

4. A composition of matter for use in testing sodium metasilicate liquors, said composition consisting essentially of an aqueous solution of a compound of cobalt selected from the group consisting of silicate liquor-soluble bromides, chlorides, nitrates, sulfates, and thiocyanates of cobalt, and a soluble salt of iron selected from the group of ferrous and ferric bromides, chlorides, nitrates, sulfates, thiocyanates, and the hexahydrate of ferrous ammonium sulfate.

5. The method according to claim 3 wherein the water-soluble salt consists of an aqueous solution of cobaltous acetate tetrahydrate and ferrous acetate.

6. The method according to claim 3 wherein the water-soluble salt consists of an aqueous solution of cobaltous acetate tetrahydrate and ferric sulfate.

References Cited in the file of this patent

Mellor's Modern Inorganic Chem., Rev. Ed., by Parkes, G. E. (1951), page 718, Longmans, Green and Co.

Merrill: "The Chem. of Silicates," J. of Chem. Education, June 1947, pages 262, 268, 269.

"Diamond Chromium Chemicals," Diamond Alkali Co. (1949), pages 11, 12 and 27.

UNITED STATES PATENT OFFICE

CERTIFICATE OF CORRECTION

Patent No. 2,909,412            October 20, 1959

Cletus E. Peeler, Jr.

It is hereby certified that error appears in the printed specification of the above numbered patent requiring correction and that the said Letters Patent should read as corrected below.

Column 1, line 37, for "incipent" read -- incipient --; column 3, line 29, for "650 C." read -- 65° C. --; line 35, for "provide" read -- provides --.

Signed and sealed this 19th day of April 1960.

(SEAL)
Attest:

KARL H. AXLINE
Attesting Officer

ROBERT C. WATSON
Commissioner of Patents